UNITED STATES PATENT OFFICE

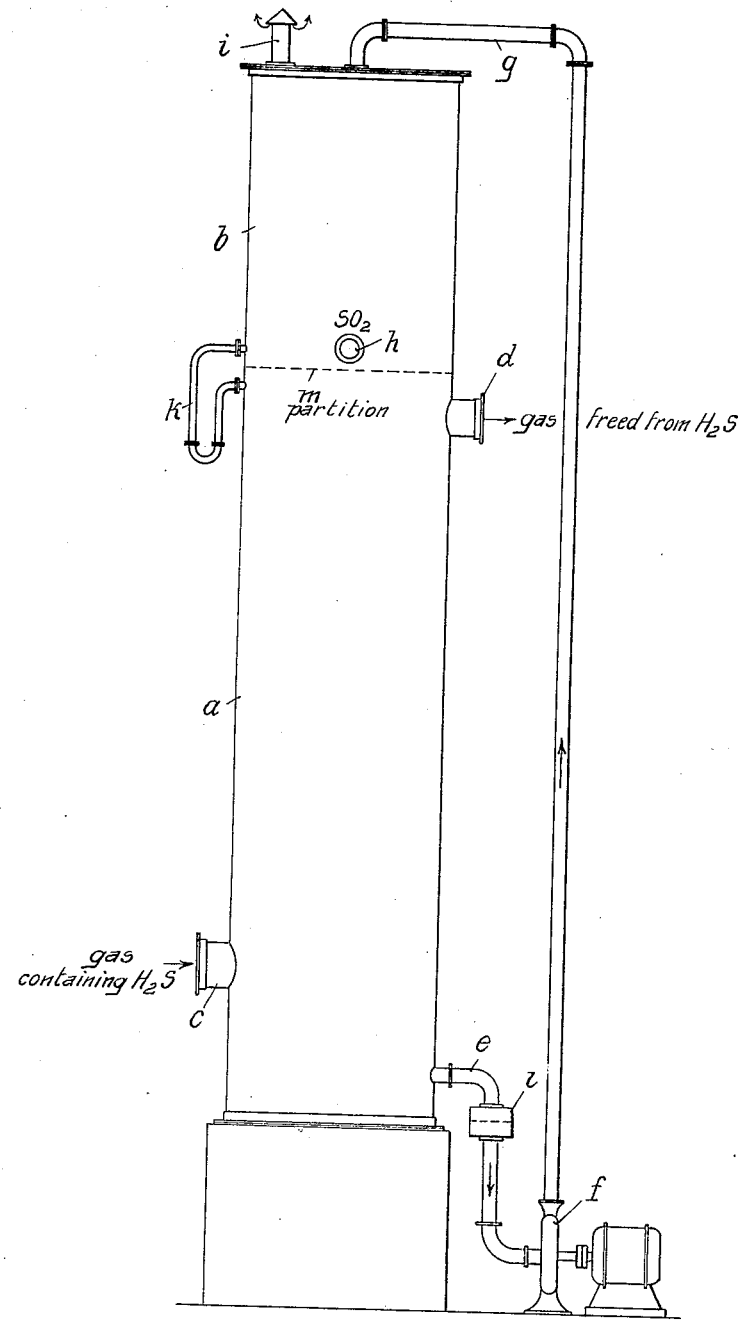

CHRISTIAN JOHANNES HANSEN, OF ESSEN-RUHR, GERMANY, ASSIGNOR, BY MESNE ASSIGNMENTS, TO THE KOPPERS COMPANY, OF PITTSBURGH, PENNSYLVANIA, A CORPORATION OF DELAWARE

REMOVING HYDROGEN SULPHIDE FROM GAS MIXTURES

Application filed August 2, 1929, Serial No. 383,112, and in Germany November 22, 1928.

My invention refers to the removal of hydrogen sulphide from gas mixtures containing same for instance coke oven gas, and one of its objects is to effect such removal in a simpler and less expensive manner than was hitherto possible.

As is well known to those skilled in the art, ammonia and hydrogen sulphide can be removed from gas mixtures by washing same with a solution of ferrous thiosulphate or other metal thiosulphates. However, when proceeding in this manner, ammonia and hydrogen sulphide can be removed only in the proportion of $2NH_3 : 1H_2S$ according to the equation $$FeS_2O_3 + H_2S + 2NH_3 = FeS + (NH_4)_2S_2O_3 \quad \text{I,}$$

and any hydrogen sulphide in excess is not washed out as it reacts with ferrous thiosulphate and other metal thiosulphates only extremely slowly. The same conditions prevail also, if gas mixtures containing hydrogen sulphide are treated with ammonium polythionate solutions.

If ferrous thiosulphate solutions are used as washing liquors, the regeneration of the spent liquid is as a rule effected by means of pure or dilute sulphur dioxide which reacts with ferrous sulphide to form ferrous thiosulphate and sulphur, according to the equation:

$$2FeS + 3SO_2 = 2FeS_2O_3 + S \quad \text{II.}$$

If an excess of sulphur dioxide is used, polythionates may also form according to equations of the type:

$$2FeS_2O_3 + 3SO_2 = 2FeS_3O_6 + S \quad \text{III,}$$

provided that the regeneration treatment is carried out at acid reaction. If such solution containing polythionates is used for washing the gas, it is also converted into ammonium thiosulphate and ferrous sulphide (FeS) which shows that such intermediary presence of polythionates does not hinder, or substantially modify, the washing procedure proper. If such a solution is used for washing the gases until the ferrous sulphide is precipitated completely, the washing out of the hydrogen sulphide and ammonia is merely effected by the ferrous thiosulphate. Now, as explained by Feld (Zeitschrift für angewandte Chemie, vol. 25, page 708), this method involves great difficulties which result from the fact that it is not possible to remove more than 1 $H_2S$ per 2 $NH_3$ contained in the gas mixture, so that the gas on being treated with this solution always contains more or less hydrogen sulphide. This fact has been confirmed by Raschig, Lepsius and Markel (Zietschrift für angewandte Chemie, vol. 33, page 260).

The present invention is based on the fact that thionate solutions containing iron will, contrary to the prescriptions given by Feld, enable the gas mixture to be freed altogether from hydrogen sulphide, no matter whether ammonia is present or not, if during the entire washing process polythionates are present in the solution in an amount sufficient to prevent the formation of FeS during the washing procedure. The formation or regeneration of polythionates is obtained according to this invention by permanently or periodically supplying to the solution the amount of sulphur dioxide required in the reactions of which Equation III gives an example. Under such circumstances hydrogen sulphide reacts with the ferrous polythionates only, and no ferrous sulphide can form or exist, because it would immediately react with polythionates to form ferrous thiosulphate according to equations of the type:

$$FeS + FeS_3O_6 = 2FeS_2O_3 \quad \text{IV.}$$

Nevertheless, hydrogen sulphide is quickly absorbed by this solution, even if little or no ammonia is present.

Possibly this very astonishing effect may be explained by the fact that the sulphur dioxide is present in this solution in a particular combination with complex polythionate compounds containing iron. This may be concluded from the fact that polythionate solutions free from iron are known to react only very slowly with hydrogen sulphide and that solutions containing iron are coloured far more intensely yellow than polythionate solutions free from iron.

The highest efficiency of such solutions is obtained if the polythionates present in the solution do not merely appear as trithionates, but partly or wholly as polythionates of a higher order. This can be provided for by supplying a sufficient amount of sulphur dioxide, even to the extent that sulphur dioxide begins escaping from the washing liquor.

As mentioned above, the new method is not only applicable in cases where ammonia is present in the gas. However, if ammonia is present, it is reacted upon by the compounds in the washing liquor and is converted into ammonium salts which can be converted into ammonium sulphate.

In practicing my invention I prefer using an apparatus, which is illustrated diagrammatically by way of example in the drawing affixed to this specification and forming part thereof.

In the drawing which shows this apparatus in elevation, a wickerwork washer is subdivided by a partition $m$ into two superposed chambers, a bottom chamber $a$ and a top chamber $b$. The gas to be freed from hydrogen sulphide enters the bottom chamber $a$ at $c$, the purified gas escapes from the bottom chamber at $d$. The washing liquor escaping from the bottom chamber $a$ at $e$ is forced by means of a pump $f$ through the inlet pipe $g$ into the top chamber $b$ where it is treated with sulphur dioxide or gases containing same, which enter at $h$. The washing liquor thus treated with sulphur dioxide escapes through siphon $k$ and is returned by it into the bottom chamber $a$. The sulphur formed in the reaction in practically pure condition is retained by the suction filter $l$ inserted between the outlet pipe $e$ and the pump $f$.

Obviously the washing liquor can also be treated with sulphur dioxide in a separate washer and alternatively the sulphur dioxide may also be added to the gas to be purified before it enters the washer. However, this is advantageous only in cases where gases free from ammonia shall be subjected to treatment.

In order to recover sulphate and sulphur, a corresponding portion of the washing liquor is converted by treatment with non-purified gas in a separate washer inserted in front of the main washer into ammonium thiosulphate and ferrous sulphide, from which it is then separated. This removal of iron has nothing to do with the washing process proper, but merely serves the purpose of preparing that portion of the liquor, which is removed from the washer, for the recovery of ammonium sulphate and sulphur. The removal of iron may of course be effected by other suitable means. The portion of the washing liquor, which has been thus prepared, is then heated in a well known manner to recover ammonium sulphate and sulphur. The resulting ferrous sulphide sludge is either redissolved in a separate tank by treating it with sulphur dioxide or gases containing same and returned into the washer or it is directly introduced into the washing liquor wherein it dissolves under the action of the sulphur dioxide. In order to prevent the purified gas from carrying along sulphur dioxide I prefer freeing it therefrom in a separate washer. This is effected preferably by washing it with the spent washing liquor containing ferrous sulphide from the first washer.

As mentioned above the washing process proper is not only applicable to gases containing ammonia. However, as the washing liquor will gradually get poorer in thionates, it is necessary, in case that little or no ammonia should be present in the gas, to replace the losses of thionates owing to the formation of sulphates by the addition of ammonia or other bases such as for instance lime or magnesia. Of course the quantity of ammonia required for this purpose is far below the proportion of $2NH_3 : 1H_2S$.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I am aware that it has already been proposed to purify gases containing hydrogen sulphide by means of an absorbent solution containing polythionates of zinc, iron or the like, whereby the absorption or washing step is continued with or without the intermediate introduction of sulphur dioxide, until not only the polythionates, but also the thiosulphates are decomposed, and the zinc or the iron present in the solution has been precipitated in the form of sulphides. The decomposition of the thiosulphates and the formation of zinc or ferrous sulphide necessitating previous decomposition of all the polythionates and the presence of ammonia equivalent to the zinc or ferrous sulphide to be formed, such a solution is not adapted to reliably absorb hydrogen sulphide throughout the washing period even in the absence of a sufficient amount of ammonia. I therefore make no claim to such method and I expressly limit my invention to a method comprising the step of maintaining in the washing solution throughout the washing period a contents of polythionates sufficient to prevent ferrous sulphide from being precipitated.

I claim:—

1. The method of removing hydrogen sulphide from gases comprising washing the gases with a polythionate solution containing iron, maintaining in said solution throughout the washing period a contents of polythionates sufficient to prevent ferrous sulphide from being precipitated.

2. The method of removing hydrogen sulphide from gases comprising washing the gases with a polythionate solution containing iron, maintaining in said solution throughout the washing period a contents of polythionates sufficient to prevent ferrous sulphide from being precipitated, and regenerating polythionates by introducing sulphur dioxide into the solution.

3. The method of removing hydrogen sulphide from gases comprising washing the gases with a polythionate solution containing iron, maintaining in said solution throughout the washing period a contents of polythionates sufficient to prevent ferrous sulphide from being precipitated, and regenerating polythionates by introducing sulphur dioxide into the solution while washing.

4. The method of removing hydrogen sulphide from gases comprising washing the gases with a polythionate solution containing iron, maintaining in said solution throughout the washing period a contents of polythionates sufficient to prevent ferrous sulphide from being precipitated, and regenerating polythionates by introducing sulphur dioxide into the solution while washing, the quantity of sulphur dioxide introduced being sufficient to form polythionates of a higher order than trithionate.

5. The method of removing hydrogen sulphide from gases comprising washing the gases with a polythionate solution containing iron, maintaining in said solution throughout the washing period a contents of polythionates sufficient to prevent ferrous sulphide from being precipitated, withdrawing at least part of the solution, regenerating polythionates in this part by introducing sulphur dioxide, and re-using the regenerated solution in cycle.

6. The method of removing hydrogen sulphide from gases comprising washing the gases with a polythionate solution containing iron, maintaining in said solution throughout the washing period a contents of polythionates sufficient to prevent ferrous sulphide from being precipitated, withdrawing at least part of the solution, regenerating polythionates in this part by introducing sulphur dioxide, the quantity of sulphur dioxide introduced being sufficient to form polythionates of a higher order than trithionate, and re-using the regenerated solution in cycle.

7. The method of removing hydrogen sulphide from gases comprising washing the gases with a polythionate solution containing iron, maintaining in said solution throughout the washing period a contents of polythionates sufficient to prevent ferrous sulphide from being precipitated, regenerating polythionates by introducing sulphur dioxide into the solution, withdrawing at least part of the solution, precipitating ferrous sulphide in and separating it from said part, and returning the ferrous sulphide into the washing solution.

8. The method of removing hydrogen sulphide from gases comprising washing the gases with a polythionate solution containing iron, maintaining in said solution throughout the washing period a contents of polythionates sufficient to prevent ferrous sulphide from being precipitated, regenerating polythionates by introducing sulphur dioxide into the solution, withdrawing at least part of the solution, precipitating ferrous sulphide in and separating it from said part, treating the ferrous sulphide with sulphur dioxide to form ferrous polythionates, and returning said polythionates into the washing solution.

9. The method of removing hydrogen sulphide from gases comprising washing the gases with a polythionate solution containing iron, maintaining in said solution throughout the washing period a contents of polythionates sufficient to prevent ferrous sulphide from being precipitated, regenerating polythionates by introducing sulphur dioxide into the solution while washing, the quantity of sulphur dioxide introduced being sufficient to form polythionates of a higher order than trithionate, treating the washed gases with spent washing liquor containing ferrous sulphide and returning this spent liquor to the main washing liquor.

In testimony whereof I affix my signature.

CHRISTIAN JOHANNES HANSEN.